United States Patent

[11] 3,622,608

[72] Inventors Gustav Schafer;
Norbert Ottaw, both of Frankfurt/Main, Germany
[21] Appl. No. 843,820
[22] Filed July 22, 1969
[45] Patented Nov. 23, 1971
[73] Assignee Farbwerke Hoechst Aktiengesellschaft vormals Meister, Lucius & Bruning Frankfurt/Main, Germany
[32] Priority Oct. 28, 1965
[33] Germany
[31] F 47533
Continuation-in-part of application Ser. No. 588,291, Oct. 21, 1966, now abandoned. This application July 22, 1969, Ser. No. 843,820

[54] NITRO ANILINO-POLYALKYLENE POLYAMINES AND THE SALTS THEREOF
6 Claims, No Drawings

[52] U.S. Cl.................................................. 260/429.9, 8/4, 8/12, 8/55, 8/57, 117/138.8 B, 117/142, 117/144, 260/501.2, 260/570.5 PA
[51] Int. Cl....................................................... C07f 3/06
[50] Field of Search............................................ 260/501.2, 570.5 PA, 425.5

[56] References Cited
UNITED STATES PATENTS
3,412,130  11/1968  Schafer et al................  260/570.5 X Primary Examiner—Robert V. Hines
Attorney—Curtis, Morris and Safford ABSTRACT: Compounds of the formula and their salts

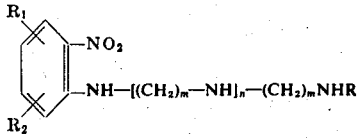

in which $R_1$ and $R_2$ each represents hydrogen or chloro, $m$ represents an integer 2 or 3 and $n$ represents an integer 1, 2, 3, or 4, $R_3$ represents hydrogen or

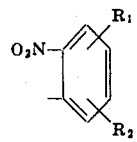

wherein $R_1$ and $R_2$ each is defined as above.

NITRO ANILINO-POLYALKYLENE POLYAMINES AND THE SALTS THEREOF

This application is a continuation in part application of our copending application Ser. No. 588,291 filed Oct. 21, 1966 and now abandoned.

The present invention provides new water-soluble basic dyestuffs and their salts and a process for preparing them; particularly, it concerns basic dyestuffs of the formula (1)

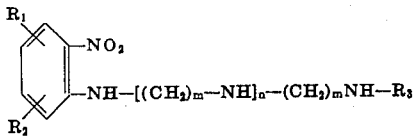

(1)

in which $R_1$ and $R_2$ each represents hydrogen or chlorine atoms, $m$ represents an integer 2 or 3 and $n$ represents an integer 1, 2, 3 or 4, $R_3$ represents a hydrogen atom or the group

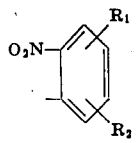

wherein $R_1$ and $R_2$ each is defined as above, or the salt of an inorganic or organic acid thereof.

We have found that new water-soluble basic dyestuffs of the formula (1) as indicated and defined above can be prepared by reacting 1 mol of a polyamine of the formula (2)
$H_2N-(CH_2)_m NH]_n-(CH_2)_m-NH_2$ (2) wherein $m$ and $n$ are defined as above, with at least 1 mol of a compound of the formula (3)

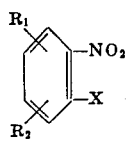

in which X represents a chlorine or bromine atom and $R_1$ and $R_2$ are defined as above, in an aqueous, aqueous-organic or organic medium, if necessary, in the presence of acid-binding agents, and by converting, if required, the basic dyestuffs thus obtained into the corresponding amine salts.

The reaction may be carried out, for example, in an alkanol of one to 10 carbon atoms, or in xylene, dimethyl formamide, ethylene glycol, diethylene glycol, diethylene glycol monoethyl ether, dioxane or tetrahydrofurane as organic medium. As acid-binding agents can be used, for example, alkali metal hydroxides, alkali metal carbonates, alkali metal hydrogen carbonates or tertiary organic bases, such as pyridine, picoline or dimethyl formamide. The reaction is carried out at temperatures between about 20° and about 150° C., preferably, between about 80° and about 120° C. The optimal temperature for each individual case is to be adjusted according to the reaction components and the reaction medium used. The reaction can also be carried out above or below the above temperature range; in case of operating at lower temperatures, however, correspondingly longer reaction periods are necessary.

According to the quantitative proportion of the reaction components used and the chosen reaction conditions, such as temperature, reaction medium, presence or absence of acid-binding agents, either uniform dyestuffs of the above-mentioned formula (1) in which $R_3$ represents either a hydrogen atom or the grouping

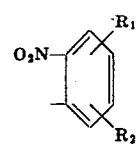

or mixtures of such dyestuffs are obtained.

The molar ratio of the two reaction components is according to the desired final product between 1:1 and 1:2, but if both primary amino groups of the diamine used are to be reacted, and a molar ratio of at least 1:2 is necessary, it is possible to use the compound of the above-mentioned general formula (3) also in an excess, for example, in a trimolar to pentamolar excess. The new dyestuffs are obtained, partly, as free bases, partly, in the form of the hydrochlorides. But they can also be converted into the corresponding dyestuff salts, for example, into the acetates, bisulfates, sulfates, phosphates or zinc chloride double salts by addition of inorganic or organic acids or of suitable salts.

The basic dyestuffs obtained according to the present invention are water-soluble, the degree of the water-solubility, however, depends to a considerable extent on the particular structure of the dyestuff. The dyestuffs obtained according to the process of the present invention produce greenish to reddish yellow dyeings or prints on polyester fibers, for example polyethylene terephthalate fibers, when they are used in the form of the free bases, and on keratin fibrous material, for example wool or leather or particularly polyacrylonitrile fibers, when they are used in the form of the salts, i.e. in an acid aqueous medium. The dyeings and prints thus obtained possess a good fastness to light and wet processing.

The following examples serve to illustrate the invention, but they are not intended to limit it thereto. The parts being by weight unless otherwise stated:

EXAMPLE 1

Sixty-five and one-half parts of dipropylene triamine are added dropwise while stirring at 80° C. to a solution of 157.5 parts of o-chloronitrobenzene in 50 parts of n-butanol. The mixture is heated to 130° to 135° C. and this temperature is maintained for about 1 hour. Then, 42 parts of sodium bicarbonate are added and stirring is continued for a further 10 hours at this temperature. After addition of about 250 parts of ethanol the solution is cooled, and the crystal mass is filtered with suction and washed with ethanol. The dry dyestuff is obtained as a yellow powder in a good yield its degree of purity can still be increased by recrystallization in glacial acetic acid. It mainly consists of the hydrochloric salt of the double-sided condensation product which produces reddish-yellow dyeings of good fastness to light on polyacrylonitrile fibers in an acid, aqueous bath.

By treating the dyestuff hydrochloride obtained in this way with a dilute aqueous sodium hydroxide solution the free basic dyestuff is obtained.

EXAMPLE 2

Fifty-one and one-half parts of diethylenetriamine are added dropwise while stirring at 80° C. to a solution of 157.5 parts of o-chloronitrobenzene in 50 parts of n-butanol. The solution is heated to 130° to 135° C. and the temperature is maintained for about 1 hour. Then 42 parts of sodium bicarbonate are added and stirring is continued for a further 10 hours at this temperature. After addition of about 250 parts of ethanol the solution is cooled and the formed double-sided condensation product is filtered with suction and washed with ethanol. The dry dyestuff is obtained in the form of the hydrochloride as a yellow crystal powder which produces reddish-yellow dyeings on polyacrylonitrile fibers in acid, aqueous bath.

By treating the dyestuff hydrochloride obtained in this way with a dilute aqueous sodium hydroxide solution the free basic dyestuff is obtained.

EXAMPLE 3

Sixty-five and one-half parts of dipropylenetriamine are added dropwise while stirring at 80° C. to a suspension of 157 parts of o-chloronitrobenzene in 60 parts of water and the mixture is stirred for 1 hour at 100° C. Then, the whole is diluted with 250 parts of methanol and the hot solution is filtered. The filtrate is acidified with dilute hydrochloric acid and stirred in the cold whereby the dyestuff (double-sided condensation product) crystallizes as hydrochloric salt. It is isolated by filtration with suction, washing and drying in the form of a yellow crystal powder. The dyestuff produces reddish-yellow dyeings of a good fastness to light on polyacrylonitrile fibers in an acid, aqueous bath. By treating the dyestuff hydrochloride obtained in this way with a dilute aqueous sodium hydroxide solution the free basic dyestuff is obtained.

EXAMPLE 4

Sixty-five parts of o-chloronitrobenzene are heated to 80° C. in about 25 parts of n-butanol while stirring.

Then 30 parts of triethylenetetramine are added dropwise and stirring is continued for about 1 hour. Then, 17 parts of sodium bicarbonate are added and the temperature of the mixture is maintained for 11 hours at 125° C. After addition of about 250 parts of methanol and 50 parts of dilute hydrochloric acid the whole is cooled while stirring. The double-sided condensation product formed as a crystal mass is filtered with suction and washed with methanol. After drying, the dyestuff is obtained as hydrochloride in the form of yellow crystals.

By treating the so obtained dyestuff hydrochloride with a dilute aqueous potassium hydroxide solution the free basic dyestuff is obtained.

EXAMPLE 5

In 500 parts by volume of dimethyl formamide 180 parts of dipropylenetriamine and 330 parts of o-nitrochlorobenzene are heated to 130° C. while stirring and this temperature is maintained for 12 hours. Then, the whole is cooled while stirring the double-sided condensation product which has precipitated in form of a crystal mass is filtered with suction and washed with ethanol. After drying, the dyestuff is obtained as a free base in the form of a yellow crystal powder whose degree of purity can still be increased by recrystallization in glacial acetic acid, while, at the same time, the acetate is formed. The dyestuff produces reddish-yellow dyeings of a good fastness to light on polyacrylonitrile fibers in an acid, aqueous bath.

Other dyestuffs which can be produced according to the foregoing examples in the form of the double-sided condensation products are mentioned in the following table:

| Polyamine component | o-Nitrochlorobenzene component | Reaction medium |
|---|---|---|
| (1) $H_2N-[(CH_2)_2-NH]_3-(CH_2)_2-NH_2$ | ![Cl, NO2 benzene] | n-Butanol. |
| (2) $H_2N-[(CH_2)_2-NH]_4-(CH_2)_2-NH_2$ | ![Cl, NO2 benzene] | Do. |
| (3) $H_2N-(CH_2)_3-NH-(CH_2)_3-NH_2$ | ![Cl, Cl, NO2 benzene] | Do. |

EXAMPLE 6

A solution of 158 parts of o-chloronitrobenzene in 130 parts of methanol is slowly added while stirring and under reflux to a solution of 130 parts of dipropylene triamine in 50 parts of methanol. The addition being terminated, the solution is stirred under reflux for 5 hours. After addition of 2 mols of concentrated hydrochloric acid, the whole is cooled. The formed crystal mass is isolated by filtration of suction and dissolved in a small amount of water while the sparingly soluble 2:1 condensation product is not dissolved. After cooling, 60 parts of an 1:1 condensation product are obtained from the filtrate in form of a yellow crystal powder which produces reddish-yellow dyeings on polyacrylonitrile fibers in an acid, aqueous bath. After drying, the residue on the filter yields about 37 parts of 2:1 condensation product which produces yellow dyeings on polyacrylonitrile fibers in acid, aqueous bath.

We claim:
1. A dyestuff of the formula

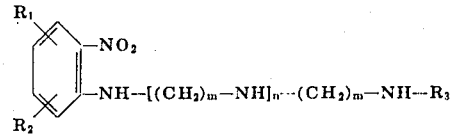

wherein $R_1$ and $R_2$ each is hydrogen or chlorine, $m$ is an integer 2 or 3, $n$ is an integer 1, 2, 3 or 4, and $R_3$ is hydrogen or the group

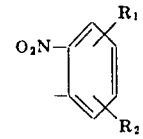

wherein $R_1$ and $R_2$ are defined as above, or the salt of an inorganic or organic acid thereof.

2. A dyestuff of the formula

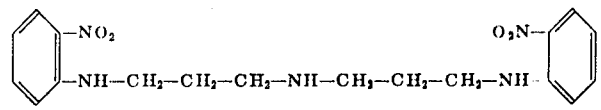

or the salt of an inorganic or organic acid thereof.

3. A dyestuff of the formula

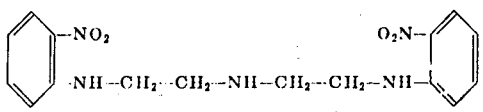

or the salt of an inorganic or organic acid thereof.

4. A dyestuff of the formula

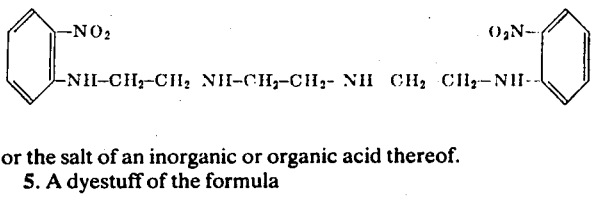

or the salt of an inorganic or organic acid thereof.

5. A dyestuff of the formula

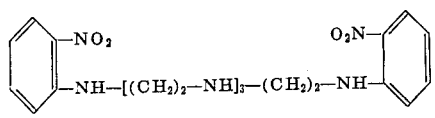
or the salt of an inorganic or organic acid thereof.
6. A dyestuff of the formula
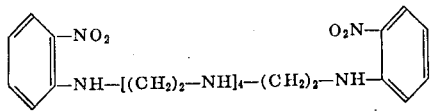
or the salt of an inorganic or organic acid thereof.
* * * * *